United States Patent
Oka

(10) Patent No.: US 9,024,868 B2
(45) Date of Patent: May 5, 2015

(54) MOBILE ELECTRONIC DEVICE

(75) Inventor: Takafumi Oka, Yokohama (JP)

(73) Assignee: Kyocera Corporation, Kyoto (JP)

(*) Notice: Subject to any disclaimer, the term of this patent is extended or adjusted under 35 U.S.C. 154(b) by 154 days.

(21) Appl. No.: 13/381,174

(22) PCT Filed: Jul. 8, 2010

(86) PCT No.: PCT/JP2010/061594
§ 371 (c)(1),
(2), (4) Date: Dec. 28, 2011

(87) PCT Pub. No.: WO2011/004856
PCT Pub. Date: Jan. 13, 2011

(65) Prior Publication Data
US 2012/0105317 A1    May 3, 2012

(30) Foreign Application Priority Data
Jul. 8, 2009 (JP) ................................ 2009-161742

(51) Int. Cl.
*H04M 1/02* (2006.01)

(52) U.S. Cl.
CPC .......... *H04M 1/0202* (2013.01); *H04M 1/0272* (2013.01)

(58) Field of Classification Search
CPC . H04M 1/0202; H04M 1/0272; H04N 9/3197
See application file for complete search history.

(56) References Cited

U.S. PATENT DOCUMENTS

| | | | | |
|---|---|---|---|---|
| 7,133,022 B2* | 11/2006 | Grabert | ......................... | 345/156 |
| 7,213,926 B2* | 5/2007 | May et al. | ........................ | 353/69 |
| 8,031,171 B2* | 10/2011 | Kashito et al. | ................ | 345/156 |
| 2008/0212041 A1* | 9/2008 | Koizumi et al. | .............. | 353/122 |
| 2009/0017872 A1* | 1/2009 | Myers et al. | .................. | 455/566 |
| 2009/0036158 A1* | 2/2009 | Fujinawa et al. | .......... | 455/556.1 |
| 2009/0051695 A1* | 2/2009 | Matsuda | ........................ | 345/556 |
| 2009/0319933 A1* | 12/2009 | Zaika et al. | .................... | 715/772 |
| 2010/0093399 A1* | 4/2010 | Kim et al. | ...................... | 455/566 |
| 2010/0105428 A1* | 4/2010 | Kim | ........................... | 455/556.1 |
| 2010/0190524 A1* | 7/2010 | Morozumi | ................. | 455/556.1 |
| 2012/0086857 A1* | 4/2012 | Kim et al. | ...................... | 348/563 |

FOREIGN PATENT DOCUMENTS

| | | | |
|---|---|---|---|
| JP | 2005331960 A | 12/2005 |
| JP | 2005345543 A | 12/2005 |

(Continued)

OTHER PUBLICATIONS

International Search Report and Written Opinion for PCT/JP2010/061594 dated Aug. 3, 2010.

(Continued)

*Primary Examiner* — Jonathan Boyd
*Assistant Examiner* — Sardis Azongha
(74) *Attorney, Agent, or Firm* — Lowe Hauptman & Ham LLP

(57) ABSTRACT

According to an aspect, a mobile electronic includes a first display unit, a second display unit, an input unit, and a control unit. The first display unit displays a first image. The second display unit displays a second image. To the input unit, an instruction is input. The control unit causes the second display unit to display the first image, as the second image, when a first period of time has passed since the first image is displayed by the first display unit.

17 Claims, 9 Drawing Sheets

(56) References Cited

FOREIGN PATENT DOCUMENTS

| | | | |
|---|---|---|---|
| JP | 2006234909 A | 9/2006 | |
| JP | 2006319819 A | 11/2006 | |
| JP | 2008252486 A | 10/2008 | |
| JP | 2009017013 A | 1/2009 | |

OTHER PUBLICATIONS

Office Action mailed Jul. 30, 2013 corresponds to Japanese patent application No. 2009-161742.

* cited by examiner

MOBILE ELECTRONIC DEVICE

CROSS-REFERENCE TO RELATED APPLICATION

This application is a National Stage of PCT international application Ser. No. PCT/JP2010/061594 filed on Jul. 8, 2010 and which is based upon and claims the benefit of priority from Japanese Patent Application No. 2009-161742, filed on Jul. 8, 2009.

FIELD

The present invention relates to a mobile electronic device provided with at least two display units.

BACKGROUND

As a conventional device for displaying an image on a screen or on a wall surface, so-called monitor and projector are used. A mobile type compact in size and easy to carry is proposed as such monitor and projector.

In Patent Literature 1, a display mode of video information having degrees of reproduction permission for a plurality of observers is determined based on input personal information for each of the observers and viewing restriction information added to digital video contents. The video information is decoded by a decoder according to the display mode, and the decoded video information is displayed according to the display mode in a mutually independent manner, for each viewpoint of the observers who view the video information from different positions via an image display unit and a local video information output unit. Patent Literature 2 also describes a device that determines whether an output is permitted based on information of contents and information of an operator.

CITATION LIST

Patent Literature

Patent Literature 1: Japanese Patent Application Laid-open No. 2006-319819
Patent Literature 2: Japanese Patent Application Laid-open No. 2009-17013

Technical Problem

The methods described in Patent Literature 1 and Patent Literature 2 require previous preparation for information for still images or moving images to be projected, and information for the observers who views images, and therefore these methods lack convenience. Besides, if the operator does not perform any setting on the images, some of the images may be projected.

For the foregoing reasons, there is a need for a mobile electronic device which allows the operator to previously check an image to be displayed.

SUMMARY

According to an aspect, a mobile electronic device includes a first display unit, a second display unit, an input unit, and a control unit. The first display unit displays a first image. The second display unit displays a second image. To the input unit, an instruction is input. The control unit causes the second display unit to display the first image, as the second image, when a first period of time has passed since the first image is displayed by the first display unit.

Advantageous Effects of Invention

The mobile electronic device according to the present invention has such advantageous effects that an operator can previously check images to be displayed and prevent an unintended image from being displayed, so that an adequate image can be displayed.

DESCRIPTION OF EMBODIMENTS

The present invention will be explained in detail below with reference to the drawings. It should be noted that the present invention is not limited by the following explanation. Besides, the components explained in the following include those that can be easily thought of by persons skilled in the art, substantially equivalents, and those in a scope of so-called equivalents. A mobile phone will be explained hereinafter as an example of the mobile electronic device, however, a target to which the present invention is applied is not limited to the mobile phones. Therefore, the present invention can also be applied to devices provided with at least two display units, such as PHSs (Personal Handyphone Systems), PDAs, portable navigation devices, portable personal computers, and gaming devices.

Figure 1:
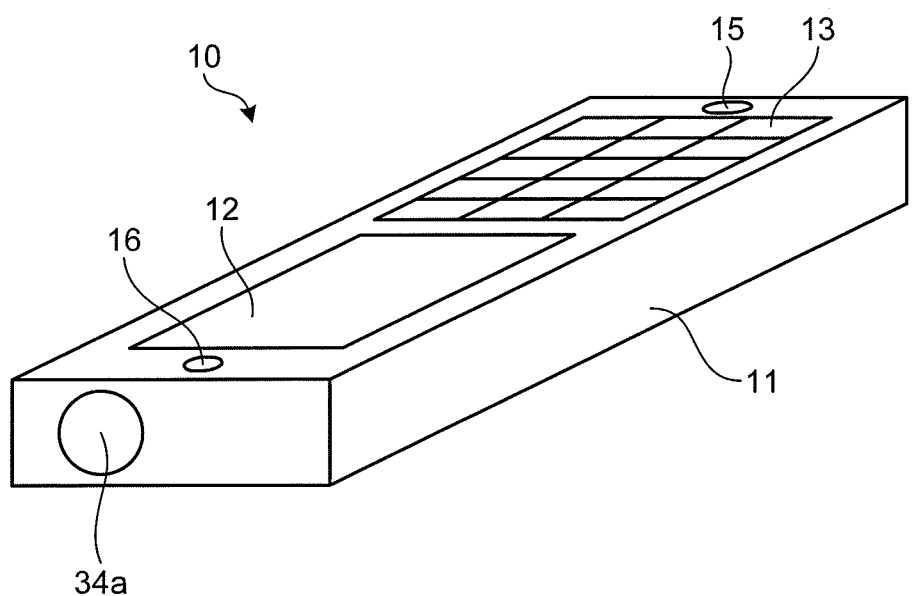
FIG. 1 is a perspective view illustrating a schematic configuration of one embodiment of a mobile electronic device.

First, an external configuration of the mobile electronic device is explained. FIG. 1 is a perspective view illustrating a schematic configuration of one embodiment of a mobile electronic device. A mobile electronic device 10 is a mobile phone provided with a wireless communication function. The mobile electronic device 10 is a straight shaped mobile phone with units stored inside of one box-shaped housing 11. In the present embodiment, the housing 11 is formed to a box shape, however, the housing may be formed with two members coupled to each other by a hinge and thereby be foldable, or the housing may be configured to have two members which are slidable. A housing connected with three or more members can also be used.

The housing 11 is provided with a display 12 as a display unit illustrated in FIG. 1. The display 12 displays a predetermined image such as a standby image when the mobile electronic device 10 is in a reception standby state and a menu image used to help operation of the mobile electronic device 10.

The housing 11 is provided with a plurality of operation keys 13 used to enter a telephone number of an intended party or to enter text when mail is composed. The operation keys 13 form an operating unit 28 of the mobile electronic device 10. The housing 11 is also provided with a microphone 15 that receives a sound during talking on the mobile electronic device 10, and with a receiver 16 that emits sound during talking on the mobile electronic device 10.

A light emitting portion 34a of a projector 34 for projecting an image is provided on a top face of the housing 11 (one side of the top face meets a short side of a face where the operation keys 13 are provided).

Figure 2:
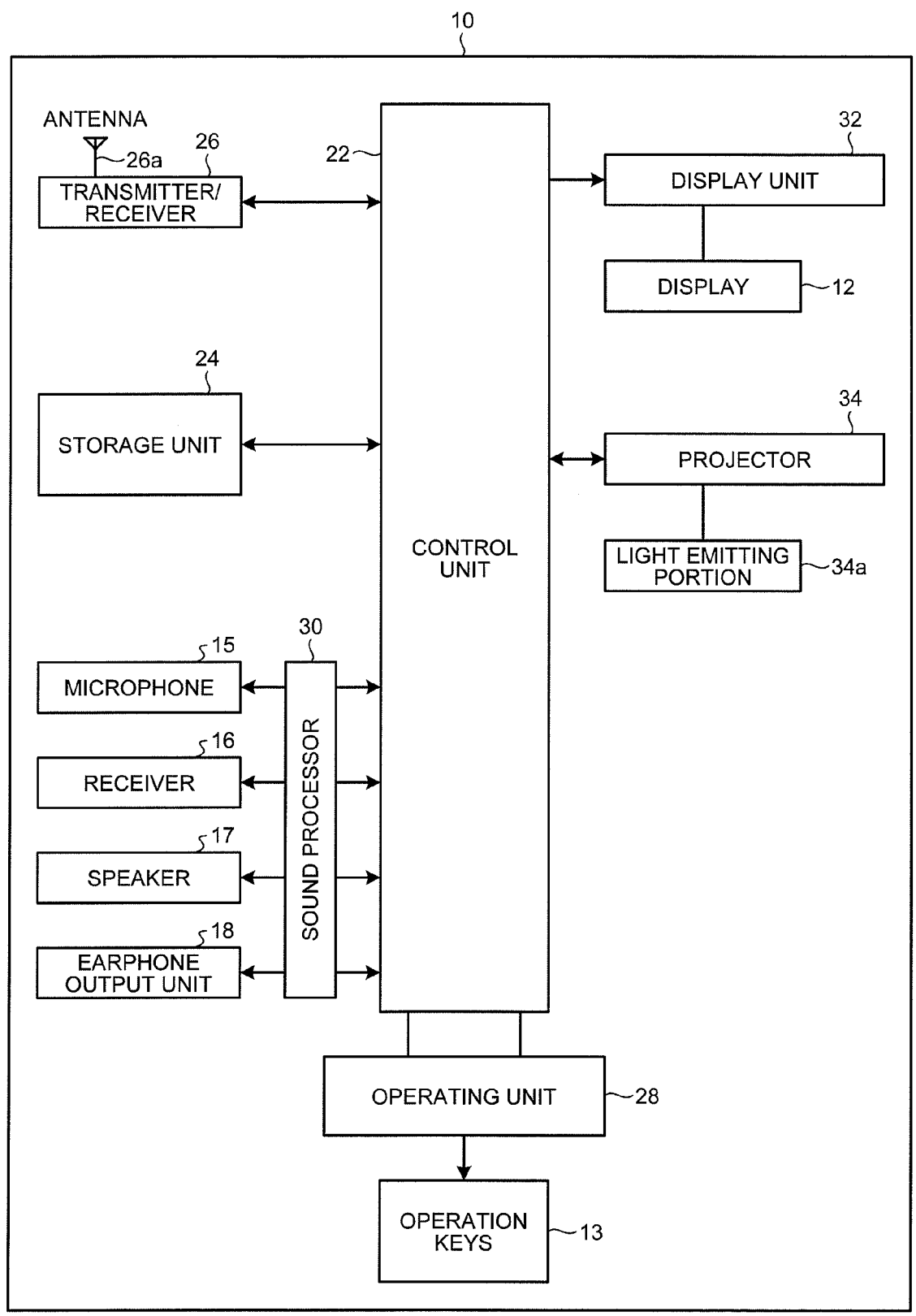
FIG. 2 is a block diagram illustrating a schematic configuration of the mobile electronic device as illustrated in FIG. 1.

FIG. 2 is a block diagram illustrating a schematic configuration of functions of the mobile electronic device as illustrated in FIG. 1. The mobile electronic device 10 as illustrated in FIG. 2 includes a control unit 22, a storage unit 24, a transmitter/receiver 26, the operating unit 28, a sound processor 30, the display unit 32, and the projector 34. The mobile electronic device 10 also includes, in addition to the receiver 16, a speaker 17 and an earphone output unit 18 as portions for outputting sound. The speaker 17 directly outputs sound, and the earphone output unit 18 causes sound to be output from an earphone connected to the earphone output unit 18.

The control unit 22 is a processor such as a CPU (Central Processing Unit) that integrally controls an overall operation of the mobile electronic device 10. That is, the control unit 22 controls the operations of the transmitter/receiver 26, the sound processor 30, the display unit 32, and the like so that the various processes of the mobile electronic device 10 are executed in an appropriate sequence according to the operation of the operating unit 28 and software stored in the storage unit 24 of the mobile electronic device 10. The various processes of the mobile electronic device 10 include, for example, voice phone conversation performed through a line switching network, composition and transmission/reception of e-mail, and browsing of a Web (World Wide Web) site on the Internet. The operations of the transmitter/receiver 26, the sound processor 30, and the display unit 32 or the like include, for example, signal transmission/reception by the transmitter/receiver 26, sound input/output by the sound processor 30, and display of an image by the display unit 32.

The control unit 22 executes processes based on programs (e.g., operating system program and application programs) stored in the storage unit 24. The control unit 22 is formed with, for example, a MPU (Micro Processor Unit), and executes the various processes of the mobile electronic device 10 according to the sequence instructed by the software. That is, the control unit 22 sequentially loads operation codes from the operating system program and the application programs stored in the storage unit 24, and executes the processes.

The control unit 22 has a function of executing a plurality of application programs. Example of the application program executed by the control unit 22 includes a plurality of application programs such as an application program for controlling the drive of the projector, an image reproduction application program for reproducing still images and moving images, and game application programs for activating various games.

The storage unit 24 stores therein software and data used for the processes performed by the control unit 22, and stores therein a task for activating the application program that controls the drive of the projector, a task for activating the image reproduction application program that reproduces still images and moving images, and a task for activating various game application programs.

The storage unit 24 stores therein, in addition to these tasks, for example, sound data downloaded or through communication, software used by the control unit 22 for controlling the storage unit 24, and address book data for storing and managing telephone numbers and mail addresses of communication opposite parties, a sound file of a dial tone, a ring tone, and so on, and temporary data used for processing processes of software. The computer programs and the temporary data used for the processing processes of the software are temporarily stored in a work area allocated to the storage unit 24 by the control unit 22. The storage unit 24 is formed with, for example, a nonvolatile storage device (e.g., nonvolatile semiconductor memory such as ROM: Read Only Memory, and a hard disk drive), and a readable/writable storage device (e.g., SRAM: Static Random Access Memory, and DRAM: Dynamic Random Access Memory).

The transmitter/receiver 26 includes an antenna 26a, and establishes a wireless signal path based on CDMA system with a base station through a channel allocated by the base station to perform telephone communication and information communication with the base station.

The operating unit 28 is formed with the operation keys 13 such as Power key, Talk key, Numeric keys, Character keys, Direction keys, OK key, and Send key to which various functions are allocated respectively. When these keys are used to enter information through the operation by the operator, the operating unit 28 emits a signal corresponding to the content of the operation. The emitted signal is input to the control unit 22 as an instruction of the operator.

The sound processor 30 executes processes of a sound signal input to the microphone 15 and a sound signal output from the receiver 16, the speaker 17, and the earphone output unit 18. That is, the sound processor 30 amplifies the sound input through the microphone 15, subjects the sound to AD conversion (Analog to Digital conversion), then further subjects the sound to signal processing such as encoding, converts the encoded sound to digital sound data, and outputs the digital sound data to the control unit 22. Moreover, the sound processor 30 decodes the sound data sent from the control unit 22, subjects the decoded data to DA conversion (Digital to Analog conversion), subjects the converted data to processes such as amplification, to be converted to an analog sound signal, and outputs the analog sound signal to at least one of the receiver 16, the speaker 17, and the earphone output unit 18.

The display unit 32 is provided with a display panel (such as the display 12) formed with a LCD (Liquid Crystal Display), an organic EL (Organic Electro-Luminescence) panel, or the like, and displays a video image according to video data supplied from the control unit 22 and an image according to image data on the display panel. The display unit 32 may be provided with, for example, in addition to the display 12, a sub-display.

Figure 3:
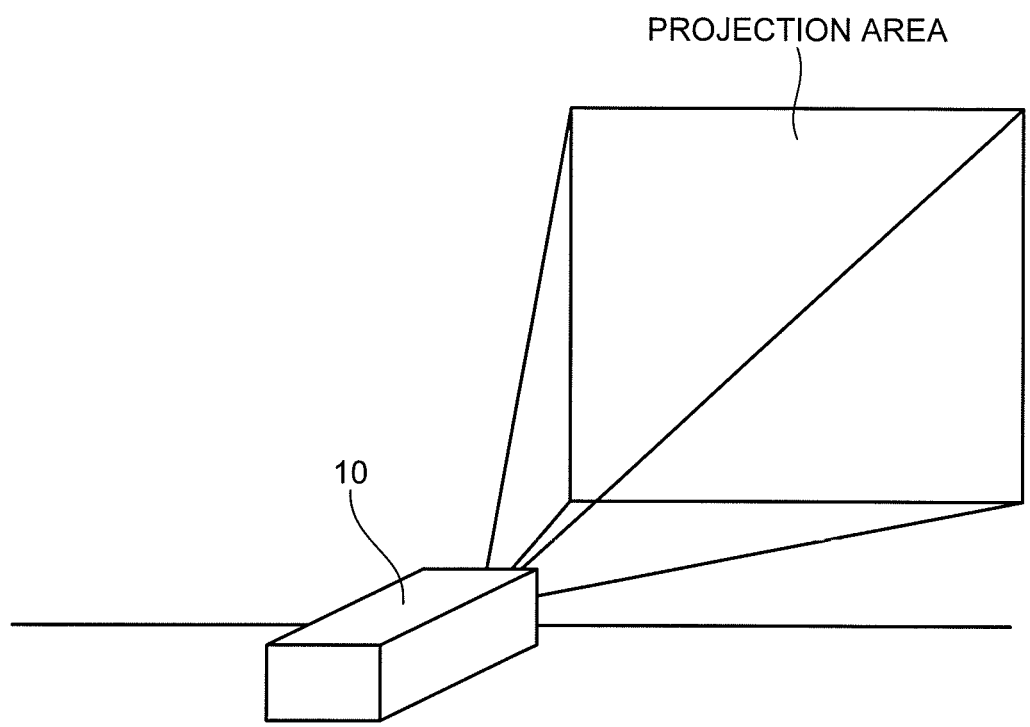
FIG. 3 is an explanatory diagram illustrating a state in which an image is displayed by the mobile electronic device as illustrated in FIG. 1.

The projector 34 is an image projection system for projecting an image, and, as explained above, is provided with the light emitting portion 34a, on the top face of the housing 11, for projecting an image. FIG. 3 is an explanatory diagram illustrating a state in which an image is displayed by the mobile electronic device as illustrated in FIG. 1. The mobile electronic device 10 projects an image from the light emitting portion 34a of the projector 34. In other words, by emitting the light forming the image, as illustrated in FIG. 3, an image can be projected to a given area (projection area) of a wall surface or a screen on a plane opposite to the top face of the housing 11. The operation of projector 34 is controlled by the control unit 22, so that various video images, such as films and presentation materials sent from the control unit 22, are projected and displayed on the projection area.

The projector 34 includes a light source and an optical system that switches whether the light emitted from the light source is projected, according to the image data. For example, as the projector 34, a projector configured with a halogen light, an LED light source, or an LD light source as the light source and with an LCD (Liquid Crystal Display) or a DMD (Digital Micro-mirror Device) as the optical system can be used. In this case, the optical system is provided over the whole area of the projection area corresponding to pixels, and the optical system is turned on or off by synchronizing the light emitted from the light source with the image, so that the image can be projected over the whole area of the projection area. As the projector 34, a projector configured with laser light that is used as a light source and with an optical system that includes a switching element for switching whether the light emitted from the light source is caused to pass through the switching element and a mirror for subjecting the light having passed through the switching element to raster scanning can also be used. In this case, by changing an angle of the light emitted from the laser light using the mirror and scanning the light irradiated from the light source over the whole area of the projection area, the image can be projected to the projection area. It should be noted that sound is output from the receiver 16, and the speaker 17 and the earphone output unit 18 which are separately provided. The mobile electronic device 10 is basically configured in the above manner.

Figure 4:
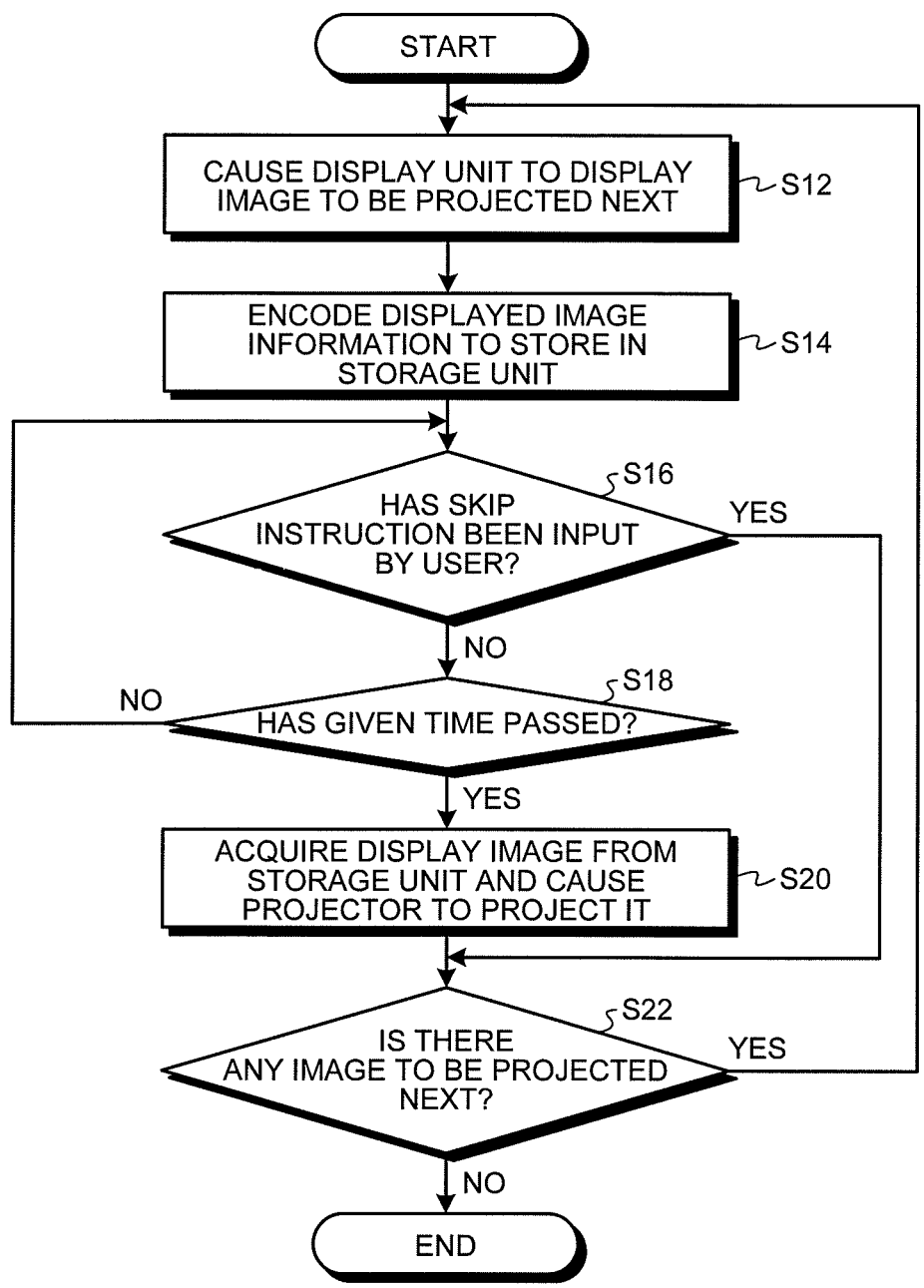
FIG. 4 is a flowchart illustrating one example of an operation of the mobile electronic device.
Figure 5:
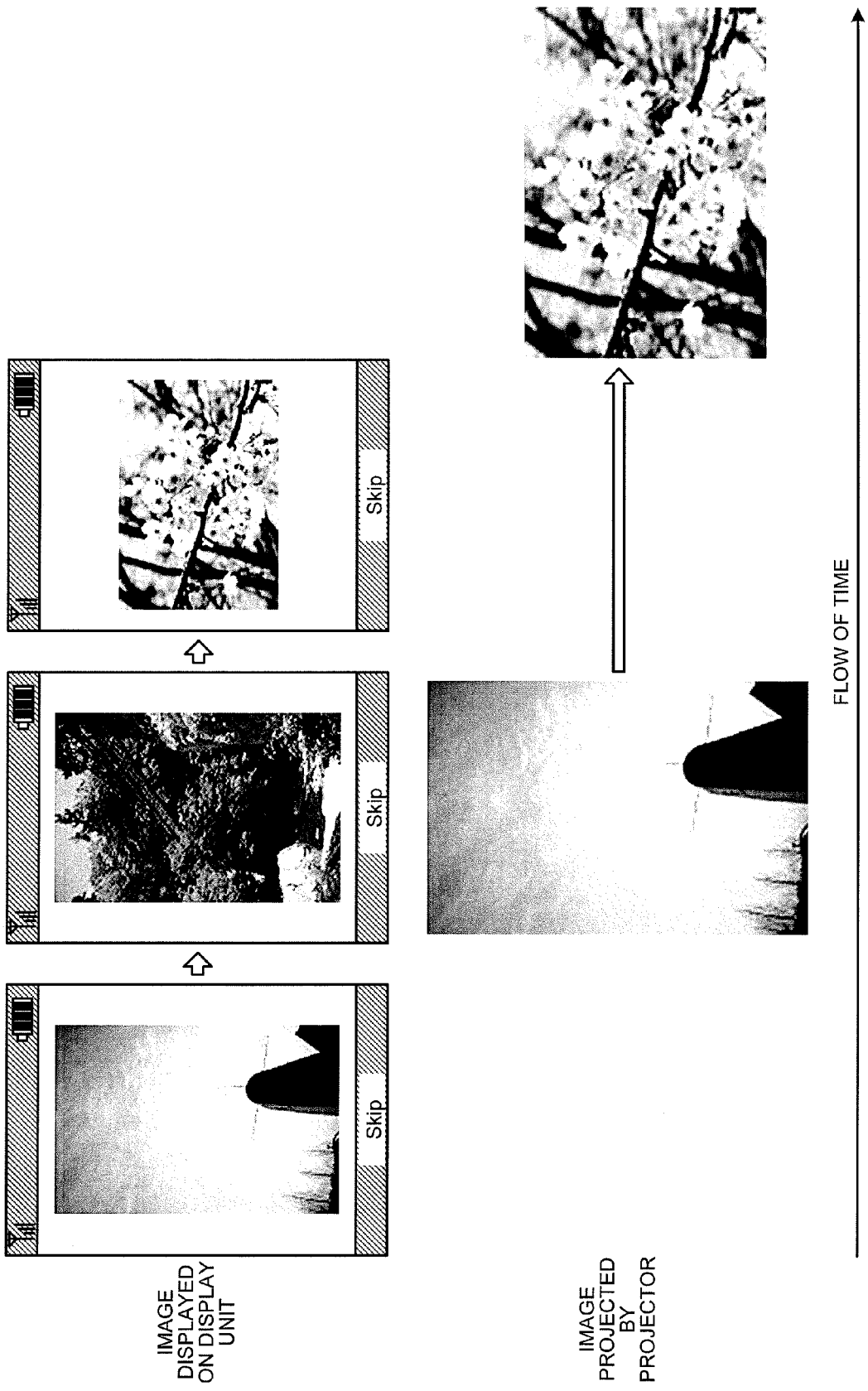
FIG. 5 is an explanatory diagram illustrating one example of images displayed on a display unit of the mobile electronic device and images projected by a projector thereof.
Figure 6:
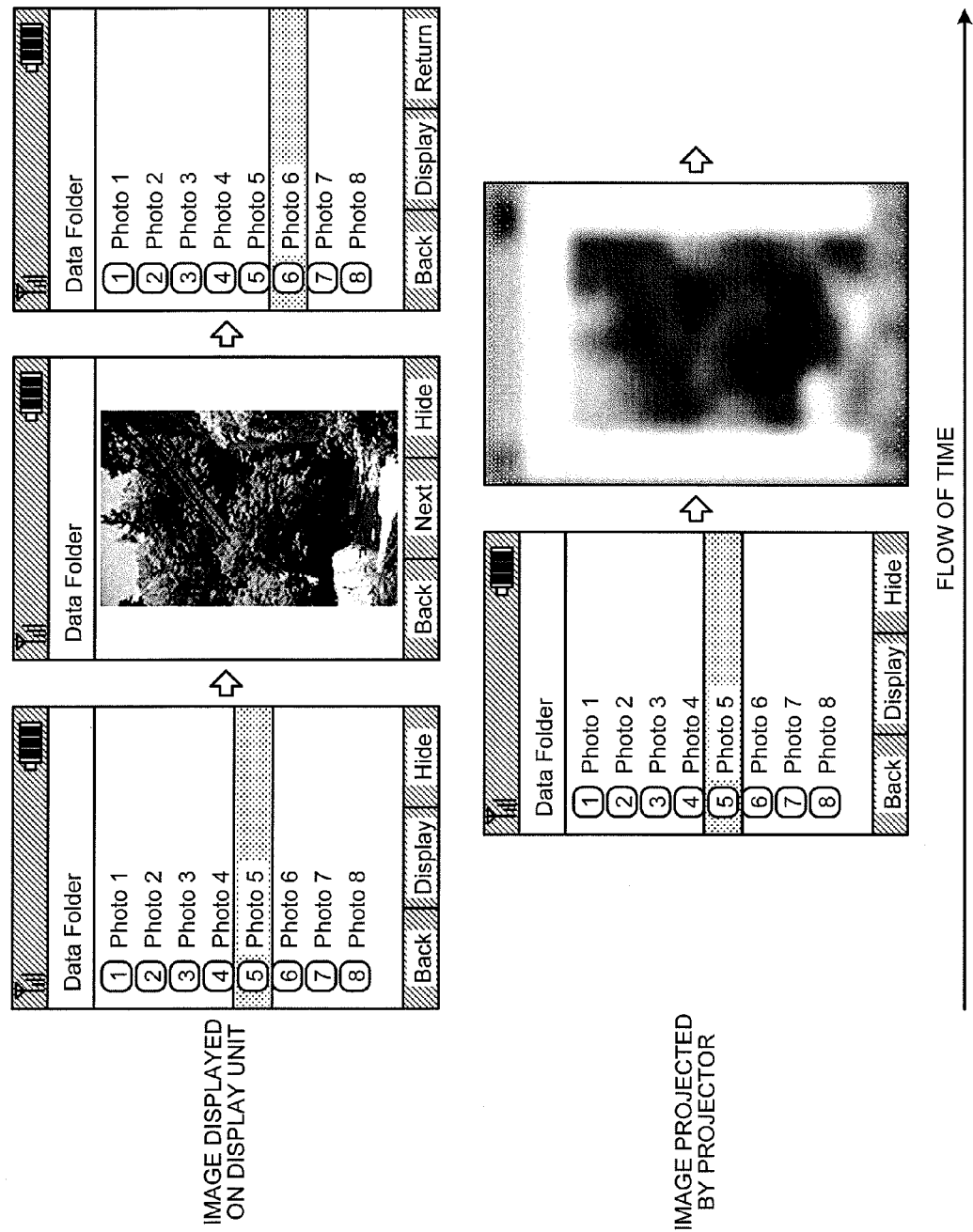
FIG. 6 is an explanatory diagram illustrating another example of images displayed on the display unit of the mobile electronic device and images projected by the projector thereof.

Next, operations of image display and projection of the mobile electronic device 10, specifically, the processing operation by the control unit 22 and images displayed on the display unit 32 and by the projector 34 will be explained with reference to FIG. 4 to FIG. 6. FIG. 4 is a flowchart illustrating one example of the operation of the mobile electronic device. FIG. 5 is an explanatory diagram illustrating one example of images displayed on the display unit of the mobile electronic device and images projected by the projector thereof, and FIG. 6 is an explanatory diagram illustrating another example of images displayed on the display unit of the mobile electronic device and images projected by the projector thereof.

Here, the examples illustrated in FIG. 4 and FIG. 5 are explained as a case where a plurality of still images are sequentially displayed, that is, a case of a display of images as a slide show. First, when an instruction to cause the projector 34 to display an image is input by the operator, the control unit 22 reads the task for activating the application program that controls the drive of the projector 34 and the task for controlling the operations of the display unit 32 and the projector 34 from the storage unit 24, and activates the application program for controlling the drive of the projector 34 and the application program for controlling the operations of the display unit 32 and the projector 34. The control unit 22 performs various processes by the activated application programs.

The control unit 22 causes the display unit 32 to display an image to be projected next, at Step S12. Specifically, the control unit 22 acquires image information from the storage unit 24 or from the outside, decodes the acquired image information to generate an image signal, and causes the display unit 32 to display the image on the display 12 thereof. After the display of the image on the display unit 32 at Step S12, the control unit 22 encodes the image information displayed on the display unit to store in the storage unit 24, at Step S14. That is, the control unit 22 stores the displayed information and information of the image in the storage unit 24.

After string the image information at Step S14, the control unit 22 determines whether a skip instruction has been input by a user (operator), at Step S16. The skip instruction is an instruction to determine that the image currently displayed on the display unit 32 is not projected by the projector 34, and is input by the operator's predetermined operation on the operation keys 13 (for example, pressing of a key allocated with the skip instruction). When it is determined at Step S16 that the skip instruction has been input by the user (Yes), the control unit 22 proceeds to Step S22.

When it is determined at Step S16 that the skip instruction has not been input by the user (No), the control unit 22 determines whether a given time (first predetermined time) has passed, at Step S18. The given time mentioned here represents a preset time. Timing of starting measurement of time can be made by various settings, and, for example, the measurement is simply started at the time of starting the display of the image on the display unit 32 at Step S12. When it is determined at Step S18 that the given time has not passed (No), the control unit 22 proceeds to Step S16. That is, the control unit 22 repeats Step S16 and Step S18 until the given time has passed, and determines whether the skip instruction has been input by the user.

When it is determined at Step S18 that the given time has passed (Yes), the control unit 22 acquires the display image from the storage unit 24 and causes the projector 34 to project the display image, at Step S20. That is, when it is determined at Step S18 that the skip instruction has not been input even if the given time has passed, the control unit 22 decodes the image information stored in the storage unit 24 at Step S14, and causes the projector 34 to project the decoded image which is displayed on the display unit 32 at Step S12.

When the projection of the image is started at Step S20 or when the skip instruction is detected at Step S16, the control unit 22 determines whether there is any image to be projected next, at Step S22. That is, the control unit 22 determines whether any image data to be displayed as the slide show still remains. When it is determined at Step S22 that there is an image to be projected next (Yes), the control unit 22 proceeds to Step S12, and repeats the processes. When it is determined at Step S22 that there is no image to be projected next (No), the control unit 22 ends the process.

A relation between images displayed on the display unit 32 and images projected by the projector 34 when the processes in the flowchart of FIG. 4 are performed will be explained below with reference to FIG. 5. In FIG. 5, its upper side represents the images displayed on the display unit 32 and its lower side represents the images projected by the projector 34. The time flows from the left side to the right side, and images to be displayed and projected are sequentially switched from the images on the left side to the images on the right side, respectively.

As illustrated in FIG. 5, when the process is started, the control unit 22 causes the display unit 32 to display a first image. At this time, the control unit 22 causes the projector 34 not to display any image. When a given time has passed while no skip instruction is input in this state, the control unit 22 causes the display unit 32 to display a second image, and causes the projector 34 to project an image displayed as the first image on the display unit 32. However, the control unit 22 causes the projector 34 not to display an image indicating a skip key, an image indicating a remaining battery level, and an image indicating a radio wave condition, which are displayed on the display unit 32, but to project only a target image.

Subsequently, when the skip instruction is input while the second image is displayed on the display unit 32, the image displayed on the display unit 32 is switched to a third image. Here, even if the image on the display unit 32 is switched from the second image to the third image, the projector 34 continues to display the first image. Thereafter, when a given time has passed since the display of the third image by the display unit 32, the image to be displayed is switched from the third image to a fourth image (not illustrated). When the image displayed on the display unit 32 is switched to the next while the skip instruction is not input as explained above, the projector 34 also switches the image to be projected from the first image displayed on the display unit 32 to the third image displayed on the display unit 32. In this manner, the projector 34 does not display the image for which skip instruction is input during the display of the image by the display unit 32.

In this way, the mobile electronic device 10 causes the display unit 32 to display an image to be projected by the projector 34 before it is projected by the projector 34, and this enables the operator (user) to determine whether the image displayed on the display unit 32 should be projected by the projector 34. Moreover, by inputting an instruction not to project the image (skip instruction), the operator can prevent the image from being projected by the projector 34. This enables the operator to prevent an image not wanted to be exposed to viewers (observers) who are viewing images projected by the projector 34 from being exposed. In addition, because the operator can determine that the image is not projected a given time before it is projected by the projector, even if the image is skipped, the image currently projected by the projector 34 can be continuously projected until an image to be projected next is determined. Therefore, the currently projected image can be switched to the next without causing the viewers to recognize that the image has been skipped.

The image is projected automatically after the given time has passed, and if an image wanted to be skipped is not displayed, then images can be sequentially projected. Thus, if there is no image not wanted to be exposed, the images can be displayed without specific operation performed by the operator.

In order that the image projection performed by the projector 34 can be continued and an image can be skipped without giving the viewers any uncomfortable feeling, it is preferable to provide a skip function and sequentially switch between the images as illustrated in FIG. 4, however, the present invention is not limited thereto. An image is simply projected by the projector 34 after a predetermined time has passed since the display of the image by the display unit 32. That is, the image has only to be displayed on the display unit 32 the given time before the image is projected by the projector 34. With this feature, if the image not wanted to be exposed is displayed on the display unit 32, the image not wanted to be exposed can be prevented from being open to the observers by stopping the projection of the image.

In the present embodiment, because the images to be projected are those of a slide show, an image for which skip instruction is input is not projected by the projector 34 even if it is displayed on the display unit 32. That is, when the skip instruction is input, it is set so that the image, displayed on the display unit 32 during the period from inputting of the skip instruction to a predetermined time before the inputting, is not projected, however, the same process is preferably performed on images irrespective of types of images and moving images to be projected. That is, when an instruction not to display an image is input, it is preferable that the control unit 22 causes the projector 34 not to display images including the image and the moving images that had been displayed on the display unit 32 a predetermined time (second predetermined time) before the instruction is input. In this way, by preventing the image displayed before the predetermined time (second predetermined time) from being displayed, for example, a series of image groups can be prevented from being exposed during also the time from when the operator recognizes the series of the image groups not wanted to be exposed to when he/she inputs an instruction not to expose them to the viewers.

In the examples illustrated in FIG. 4 and FIG. 5, the image that the operator does not want to expose is not projected, that is, the image is skipped, however, the image that the operator does not want to expose may be subjected to a blurring process. The blurring process is specifically explained below with reference to FIG. 6. FIG. 6 is an explanatory diagram illustrating another example of images displayed on the display unit 32 of the mobile electronic device and images projected by the projector 34 thereof. In FIG. 6, also, its upper side represents the images displayed on the display unit 32 and its lower side represents the images projected by the projector 34. The time flows from the left side to the right side, and images to be displayed and projected are sequentially switched from the images on the left side to the images on the right side, respectively. In the example illustrated in FIG. 6, it is set so that an image displayed on the display unit 32 is projected by the projector 34 after a given time has passed. Provided in the input unit are a Hide button for instructing a process for blurring and projecting an image, and a Back button for ending the blurring process.

As illustrated in FIG. 6, when the process is started, the mobile electronic device 10 causes the display unit 32 to display the first image. At this time, however, the mobile electronic device 10 causes the projector 34 not to display any image. When the given time (first predetermined time) has passed while no skip instruction is input in this state, an image displayed as the first image on the display unit 32 is also projected to the projector 34.

Thereafter, the operator operates so as to switch the display of the display unit 32, and the second image is thereby displayed. At this time, when the operator determines that he/she does not want to expose the image displayed on the display unit 32, then the operator presses the Hide button. When detecting that the Hide button is pressed, the control unit 22 subjects the second image to the blurring process. In this case, the image having been subjected to the blurring process may be displayed on the display unit 32, or an original image not subjected to the blurring process and a message indicating that the image is subjected to the blurring process may be displayed thereon.

Thereafter, when the given time (first predetermined time) has passed since the display of the second image on the display unit 32, the control unit 22 causes the projector 34 to project the second image. At this time, the image projected by the projector 34 is the image having been subjected to the blurring process as illustrated in FIG. 6, so that the observer cannot recognize what the original image is like. Thereafter, the operator switches the image displayed on the display unit 32 to the third image while viewing the image displayed on the display unit 32. The operator repeats such operations, and when an image determined that it can be projected by the projector 34 is displayed on the display unit 32, the operator presses the Back button and ends the blurring process. The image displayed on the display unit 32 after the end of the blurring process is displayed by the projector 34, after the given time has passed, similarly to the state where the image is displayed on the display unit 32, that is, in the state where the image is not subjected to the blurring process.

In this manner, instead of the image skipping, the image is subjected to the blurring process so as not to be found out what is displayed and the processed image is projected by the projector 34, so that the image not wanted to be exposed to the observers can also be prevented from being exposed.

Even if the image is subjected to the blurring process as explained above, it is preferable that, when the instruction to perform the blurring process is input, the image, displayed on the display unit during the time from when the instruction of the blurring process is input to a predetermined time (second predetermined time) before the inputting, is subjected to the blurring process, and is then projected. As explained above, the blurring process is performed to an image before the predetermined time, so that images during the time, from when the operator recognizes the images not wanted to be exposed to when the operator inputs an instruction not to expose them, can also be prevented from being exposed. Moreover, when the Back button is pressed, the blurring process may be stopped from an image at the time when the Back button is pressed, or the blurring process may be stopped from an image at the given time before from when the Back button is pressed. In order to more reliably prevent the image not wanted to be exposed to the observers from being exposed, the blurring process has only to be stopped from the image at the time when the Back button is pressed.

When an image for which skip instruction is input is prevented from being projected and if the image is continuous like a moving image, it may be configured that the skip instruction and the back instruction can be input, similarly to the processes illustrated in FIG. 6, and the image may be displayed when the back instruction is input.

When the image for which skip instruction is input is not projected, and if a time lag between the image displayed on the display unit and the image projected by the projector is within a set time, that is, if projection of the image by the projector is determined and images not yet projected are not accumulated to those for a set time, the control unit 22 preferably causes the display unit to display images at fast speed. In this manner, by fast-feeding the images to be displayed on the display unit, a given time lag can be provided between the image displayed on the display unit and the image projected by the projector even if the image is skipped. Thus, it is possible to prevent the case that the image projected by the projector will catch the image displayed on the display unit and the image cannot thereby be skipped and to adequately prevent the image not wanted to be exposed from being exposed.

When images to be displayed and projected correspond to a sound, it is preferable that the control unit 22 outputs the sound corresponding to the image displayed on the display unit 32 from the earphone output unit 18 and outputs the sound corresponding to the image projected by the projector 34 from the speaker 17. This enables the observers to hear the sound, output from the speaker 17, corresponding to the image projected by the projector 34, and enables the operator to hear the sound, output from the earphone output unit 18, corresponding to the image displayed on the display unit 32. The sounds respectively required for these persons can be output.

When images to be displayed and projected are moving images, similarly to the embodiment, by encoding the images displayed on the display unit using moving-image encoding to store the encoded images in the storage unit and decoding the information stored in the storage unit to project the decoded information to the projector, the amount of information processed in the control unit can be reduced. A memory capacity for storage required for this case is Encoding rate× Delayed time. This allows reduction in the amount of information to be processed and reduction in a storage area to be used even if the images are displayed with a time lag.

The images controlled by the control unit to be displayed on the display unit or to be projected by the projector are not limited to a slide show and moving images, and thus, for example, still images, images of Flash (registered trademark), contents of TV broadcast service such as One Seg that is provided in Japan, contents of streaming service, images captured by a camera, and of office documents can also be displayed. The images of the One Seg and the images of the streaming are moving images, the images of the camera include still images and moving images, and the images of the office documents are at least one of moving images, still images, and images of Flash.

The mobile electronic device may be provided with a camera and a One Seg tuner in addition to the above configuration. A photographing mechanism configured with a CCD (Charge Coupled Device) image sensor or the like and for photographing an image can be used as the camera. An image photographed by the camera is processed using an application program driven by the control unit 22, so that the image is displayed on the display 12 of the display unit 32, is projected by the projector 34, and is stored in the storage unit 24.

The One Seg tuner has a TV antenna for receiving radio waves of digital terrestrial broadcasting having a plurality of channels, in the present embodiment, of a predetermined channel for One Seg broadcasting, and processes a received signal received by the TV antenna and sends the signal to the control unit 22. The control unit 22 displays the image information sent from the One Seg tuner on the display 12 of the display unit 32 and causes the projector to project the image information, so that images of a TV program can be exposed. The sound is output from the receiver 16, the speaker 17, and the earphone output unit 18 via the sound processor 30. Here, as a specific example, the One Seg tuner performs signal processing such as amplification, detection, frequency conversion, or the like, on the received signal received by the TV antenna using a tuning device, converts the signal to a digital signal, in the present embodiment, to MPEG-2 TS (Transport Stream), and outputs the digital signal to the control unit 22. The output digital signal is processed by the application program driven by the control unit 22, and the processed signal is displayed on the display 12 of the display unit 32, is projected by the projector, and is stored in the storage unit.

The present embodiment has explained the case of the mobile electronic device provided with the display unit and the projector, however, the present invention is not limited thereto, and can therefore be applied to a device provided with at least a first display unit and a second display unit. That is, instead of the projector, a liquid crystal display, an organic EL display, or the like may be used as the second display unit, and a display device of other system may be used. The first display unit displays an image which is basically viewed by the operator, and the second display unit displays an image which can be also viewed by third parties other than the operator. As for the first display unit and the second display unit, it is preferable that an image displayed on the second display unit is larger than an image displayed on the first display unit. By displaying the larger image on the second display unit, a plurality of viewers can easily view the image. It goes without saying that the second display unit may be a display unit of other mobile electronic device.

The result of selection as to whether each of the images is displayed performed when it is projected by the projector may be stored in association with the image. Furthermore, when the image is displayed in a different occasion, the control unit 22 may control the display of the image based on the stored information. If the user (operator) selects such control as above, the control unit controls the projector so as to display images except for the image determined previously that it is not displayed. This allows images to be projected according to user's selection without selecting each time whether to display or hide each of the images.

Moreover, instead of displaying the image subjected to the blurring process, a dummy image (third image) being an image with a message such as "In processing" and "Please wait" described therein may be displayed. This enables the viewers viewing the image by the second display unit (e.g., projector) not to notice that the operator causes a specific image not to be displayed.

Figure 7:
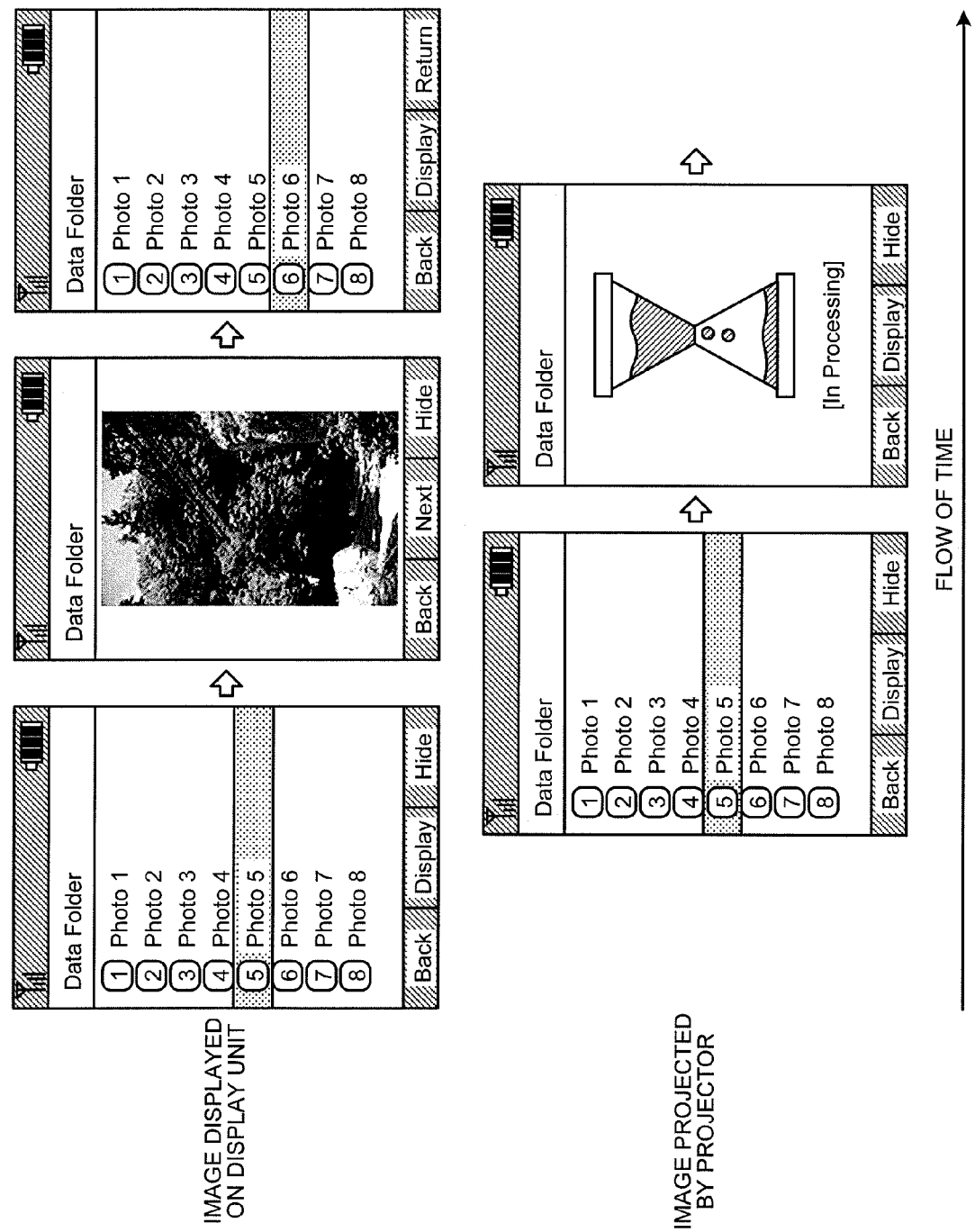
FIG. 7 is an explanatory diagram illustrating another example of images displayed on the display unit of the mobile electronic device and images projected by the projector thereof.

FIG. 7 is a diagram in which the images displayed on the display unit and images projected by the projector, in a case the mobile electronic device causes the projector to display the dummy image, are arranged in chronological order, respectively. As explained with reference to FIG. 6, when starting the process, the mobile electronic device 10 causes the display unit 32 to display the first image. At this time, however, the mobile electronic device 10 causes the projector 34 not to display (project) the first image yet. After the given time has passed while no skip instruction is input in this state, the mobile electronic device 10 causes the projector 34 to project an image displayed as the first image on the display unit 32.

Thereafter, the operator operates so as to switch the display on the display unit 32, and the second image is thereby displayed. At this time, when the operator determines that he/she does not want to expose the image displayed on the display unit 32, the operator presses the Hide button. When detecting that the Hide button is pressed, the control unit 22 starts preparation of a dummy image being an image instead of the second image. At this time, the control unit 22 may cause the display unit 32 to display the dummy image, or may cause the display unit to display the second image and a message indicating that the dummy image is displayed instead.

Subsequently, after the given time has passed since the display of the second image on the display unit 32, the control unit 22 causes the projector 34 to project the dummy image instead of the second image. At this time, the dummy image projected by the projector 34 is an icon such as an hourglass indicating that the control unit 22 is in the middle of performing image display processing, or is a text display image such as "In process of being displayed". Thereafter, the operator switches the image to be displayed on the display unit 32 to the third image while viewing the image displayed on the display unit 32. The operator repeats these operations, and, when the image determined that it can be projected by the projector 34 is displayed on the display unit 32, presses the Back button to cause the projector 34 to end the display of the dummy image. The image displayed on the display unit 32 after the end of the display of the dummy image is displayed by the projector 34 after the given time has passed.

As a result, the observer cannot recognize the image not projected by the projector 34 due to pressing of the Hide button by the operator. This enables the operator to hide the image from the observer. In addition, the observer having viewed the image projected by the projector 34 just recognizes that it merely takes time for the control unit 22 to perform the image processing. Therefore, the operator can prevent the observer from noticing even the fact that the image not wanted to be viewed is hidden.

Figure 8:
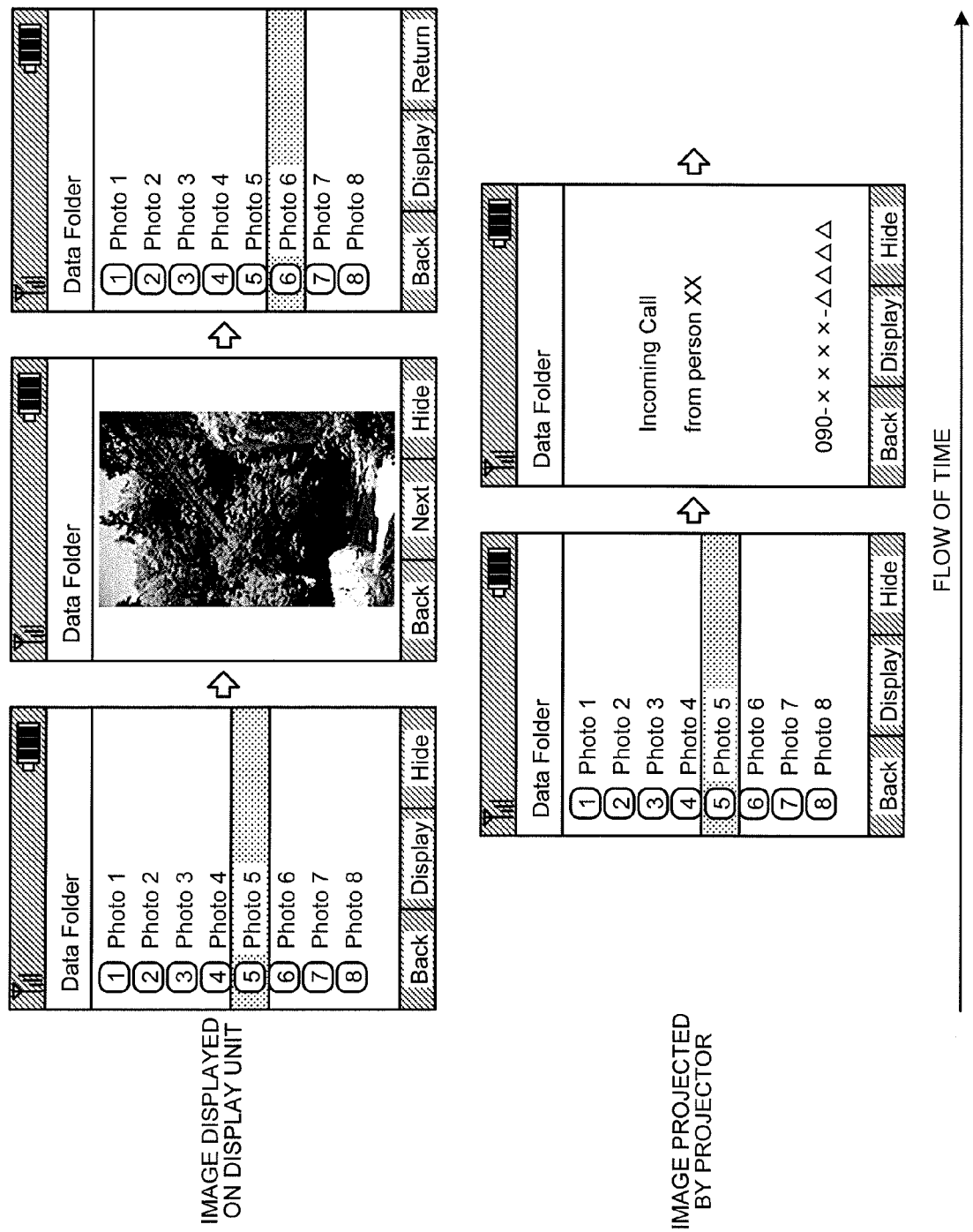
FIG. 8 is an explanatory diagram illustrating another example of images displayed on the display unit of the mobile electronic device and images projected by the projector thereof.

FIG. 8 is a diagram, similarly to FIG. 7, in which the images displayed on the display unit and images projected by the projector in a case the mobile electronic device 10 causes the projector 34 to display the dummy image are arranged in chronological order, respectively. As explained with reference to FIG. 6 and FIG. 7, when starting the process, the mobile electronic device 10 causes the display unit 32 to display the first image. At this time, however, the mobile electronic device 10 causes the projector 34 not to display any image. After the given time has passed while no skip instruction is input in this state, the mobile electronic device 10 causes the projector 34 also to project the image displayed as the first image on the display unit 32.

Thereafter, the operator operates so as to switch the display on the display unit 32, and the second image is thereby displayed. At this time, when the operator determines that he/she does not want to expose the image displayed on the display unit 32, the operator presses the Hide button. When detecting that the Hide button is pressed, the control unit 22 starts preparation of a dummy image being an image instead of the second image. At this time, the control unit 22 may cause the display unit 32 to display the dummy image, or may cause the display unit to display the second image and a message indicating that the dummy image is displayed instead.

Subsequently, after the given time has passed since the display of the second image on the display unit 32, the control unit 22 causes the projector 34 to project the dummy image instead of the second image. At this time, the dummy image projected by the projector 34 is a false email receipt notification image being a "fake" of an email receipt notification image displayed on the display unit 32 by the control unit 22 when the transmitter/receiver 26 receives the email from a base station. Thereafter, the operator switches the image to be displayed on the display unit 32 to the third image while viewing the image displayed on the display unit 32. The operator repeats these operations, and, when the image determined that it can be projected by the projector 34 is displayed on the display unit 32, presses the Back button to cause the projector 34 to end the display of the dummy image. The image displayed on the display unit 32 after the end of the display of the dummy image is displayed by the projector 34 after the given time has passed.

As a result, the observer cannot recognize the image not projected by the projector 34 due to the pressing of the Hide button by the operator. In addition, the observer having viewed the image projected by the projector 34 only recognizes that the transmitter/receiver 26 is in the middle of receiving the email. Therefore, similarly to the embodiment explained with reference to FIG. 7, the operator can prevent the observer from noticing even the fact that the image not wanted to be viewed is hidden.

The mobile electronic device 10 causes the projector 34 to display the image displayed on the display unit 32 after the given time since the display of the image on the display unit 32. This configuration allows the operator, when the image not wanted to be exposed to the viewers is displayed on the display unit 32, to prevent the image not wanted to be exposed to the other parties from being displayed by the projector 34 by covering the projector 34 with his/her hand or by turning off the power to the mobile electronic device 10.

Figure 9:
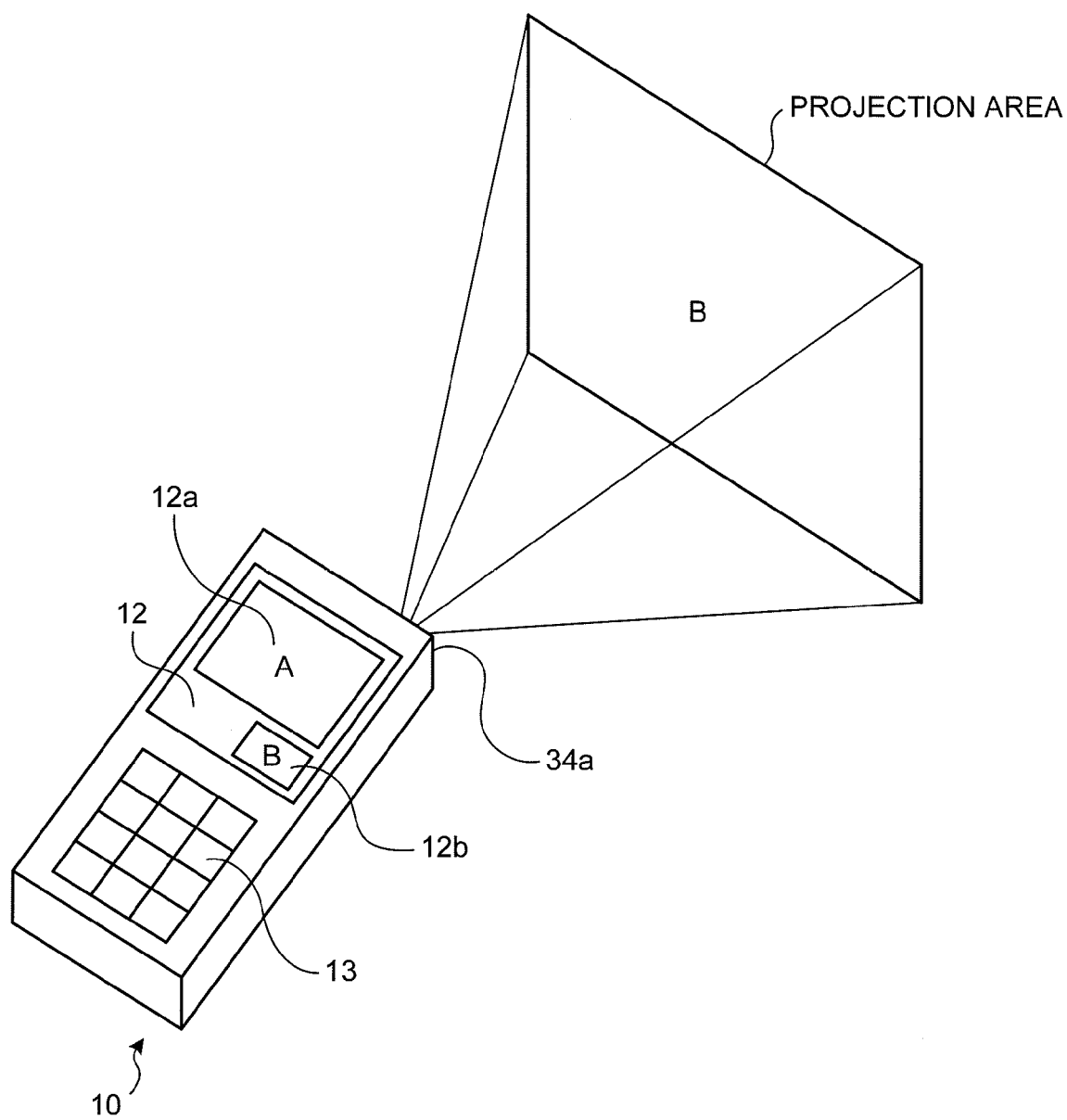
FIG. 9 is an explanatory diagram illustrating a state in which images are displayed by the mobile electronic device.

The mobile electronic device 10 may have the display unit 32 that includes two display areas, as illustrated in FIG. 9, a first display area 12a and a second display area 12b. The display unit 32 may display the image explained at Step S12 in FIG. 4 on the first display area 12a, and may display the image displayed by the projector 34 on the second display area 12b. That is, the mobile electronic device 10 may separate the display area into the first display area 12a and the second display area 12b, and may display the image (first image) displayed on the display unit in the foregoing embodiments and the image (second image) projected by the projector 34 to the respective areas. This configuration allows the operator to confirm the two images such as the image before displayed by the projector 34 and the image displayed by the projector 34 simply by viewing only the display unit 32.

INDUSTRIAL APPLICABILITY

As explained above, the mobile electronic device according to the present invention is suitable to display an adequate image for the operator.

The invention claimed is:

1. A mobile electronic device, comprising:
 a first display unit configured to sequentially display a plurality of images as preview images;
 a second display unit configured to display an observed image;
 a control unit configured to, while a current preview image among the plurality of images is currently displayed on the first display unit,
  cause the first display unit to display a skip key to input a skip instruction,
  when no skip instruction is input via the skip key during a period of time from a start of displaying of the current preview image on the first display unit, cause the second display unit to display the current preview image as the observed image when said period of time has passed, and
  in response to the skip instruction input via the skip key during said period of time, cause the second display unit to skip displaying the current preview image as the observed image when said period of time has passed;
 a speaker configured to output sound; and
 an earphone output unit configured to output sound, wherein
 the control unit is configured to output sound corresponding to the images displayed by the first display unit from the earphone output unit, and
 the control unit is configured to output sound corresponding to the images displayed by the second display unit from the speaker.

2. The mobile electronic device according to claim 1, wherein
 the control unit is configured to cause, in response to the skip instruction input via the skip key during said period of time,
  the first display unit to display a subsequent preview image among the plurality of images.

3. The mobile electronic device according to claim 2, wherein
 the control unit is configured to cause, in response to the skip instruction input via the skip key during said period of time,
  the second display unit to display not the current preview image but another image, that has been displayed by the second display unit before the skip instruction is input, as the observed image, when the period of time has passed.

4. The mobile electronic device according to claim 1, wherein
 the control unit is configured to cause, in response to the skip instruction input via the skip key during said period of time,
  the second display unit to display not the current preview image but a predetermined image, as the observed image, when the period of time has passed.

5. The mobile electronic device according to claim 4, wherein the predetermined image is an image indicating that image control process is in processing.

6. The mobile electronic device according to claim 4, further comprising:
 a communication unit for receiving wireless information, wherein
 the predetermined image is an image indicating reception of the wireless information.

7. The mobile electronic device according to claim 1, wherein the second display unit is an image projector.

8. The mobile electronic device according to claim 1, wherein the second display unit is configured to display images with larger sizes than those the first display unit displays.

9. The mobile electronic device according to claim 1, wherein
 the first display unit includes a first display area and a second display area, and
 the control unit is configured to cause
  the current preview image to be displayed on the first display area, and
  the observed image to be simultaneously displayed on the second display area and on the second display unit.

10. The mobile electronic device according to claim 1, wherein
 said period of time is sufficient for a user to input the skip instruction after the start of displaying of the current preview image on the first display unit.

11. A mobile electronic device, comprising:
 a first display unit configured to sequentially display a plurality of images as preview images;
 a second display unit configured to display an observed image;
 a control unit configured to, while a current preview image among the plurality of images is currently displayed on the first display unit,
  cause the first display unit to display a key to input a blurring instruction,
  when no blurring instruction is input via the key during a period of time from a start of displaying of the current preview image on the first display unit, cause the second display unit to display the current preview image as the observed image when said period of time has passed, and
  in response to the blurring instruction input via the key during said period of time, cause the second display unit to display the current preview image, that has been subjected to blurring process, as the observed image, when the period of time has passed.

12. The mobile electronic device according to claim 11, wherein
 said period of time is sufficient for a user to input the blurring instruction after the start of displaying of the current preview image on the first display unit.

13. A mobile electronic device, comprising:
 a first display unit configured to sequentially display a plurality of images as preview images;
 a second display unit configured to display an observed image; and a control unit configured to, while a current preview image among the plurality of images is currently displayed on the first display unit,
- cause the first display unit to display a skip key to input a skip instruction,
- when no skip instruction is input via the skip key during a period of time from a start of displaying of the current preview image on the first display unit, cause the second display unit to display the current preview image as the observed image when said period of time has passed, and
- in response to the skip instruction input via the skip key during said period of time, cause the second display unit to skip displaying the current preview image as the observed image when said period of time has passed.

14. The mobile electronic device according to claim 13, wherein
the control unit is configured to cause, in response to the skip instruction input via the skip key during said period of time,
the first display unit to display a subsequent preview image among the plurality of images.

15. The mobile electronic device according to claim 14, wherein
the control unit is configured to cause, in response to the skip instruction input via the skip key during said period of time,
the second display unit to display not the current preview image but another image, that has been displayed by the second display unit before the skip instruction is input, as the observed image, when the period of time has passed.

16. The mobile electronic device according to claim 15, wherein
the control unit is configured to cause, during said period of time,
the second display unit to display, as the observed image, a previous preview image among the plurality of images.

17. The mobile electronic device according to claim 13, wherein
said period of time is sufficient for a user to input the skip instruction after the start of displaying of the current preview image on the first display unit.

* * * * *